(12) United States Patent
Yang

(10) Patent No.: US 10,228,710 B2
(45) Date of Patent: Mar. 12, 2019

(54) PRESSURE BALANCING MIXING VALVE AND WATER VALVE INCLUDING THE SAME

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 0 days.

(21) Appl. No.: 15/725,105

(22) Filed: Oct. 4, 2017

(65) Prior Publication Data

US 2018/0032093 A1 Feb. 1, 2018

Related U.S. Application Data

(63) Continuation-in-part of application No. 15/383,534, filed on Dec. 19, 2016, now abandoned, which is a continuation-in-part of application No. 14/080,682, filed on Nov. 14, 2013, now abandoned.

(30) Foreign Application Priority Data

Jul. 12, 2013 (TW) .............................. 102213282 U

(51) Int. Cl.
*G05D 23/13* (2006.01)
*G05D 16/10* (2006.01)

(52) U.S. Cl.
CPC ....... *G05D 23/1306* (2013.01); *G05D 16/103* (2013.01)

(58) Field of Classification Search
CPC .......................... G05D 16/103; G05D 23/1306
USPC ........................................................ 236/12.1
See application file for complete search history.

(56) References Cited

U.S. PATENT DOCUMENTS

| | | | |
|---|---|---|---|
| 4,917,137 A | 4/1990 | Symmons | |
| 5,355,906 A | 10/1994 | Marty | |
| 5,492,149 A | 2/1996 | Loschelder | |
| 5,547,348 A * | 8/1996 | Riley | F04B 1/0421 417/273 |
| 5,829,469 A | 11/1998 | Sileno, Jr. | |
| 5,975,107 A | 11/1999 | Brock | |
| 7,165,570 B1 | 1/2007 | Lordahl | |
| 2009/0308459 A1 | 12/2009 | Gross | |
| 2010/0058534 A1 | 3/2010 | Martin | |

FOREIGN PATENT DOCUMENTS

| | | | |
|---|---|---|---|
| TW | M421424 | * | 9/2011 |
| TW | M421420 U | | 1/2012 |
| TW | M421424 U | | 1/2012 |

* cited by examiner

*Primary Examiner* — Henry Crenshaw
(74) *Attorney, Agent, or Firm* — Muncy, Geissler, Olds & Lowe, P.C.

(57) ABSTRACT

A water valve includes a valve body, a stationary sleeve, and a movable sleeve. The stationary sleeve is received in the valve body, and the movable sleeve is slidably disposed in the stationary sleeve. A partition plate is formed in the movable sleeve to partition the movable sleeve into a cold water cavity and a hot water cavity at two ends respectively. An external wall of the movable sleeve is formed with an annular groove positionally corresponding to the partition plate. When the partition plate is pushed under different pressure of cold water and hot water, the movable sleeve is moved to regulate flow ratio of cold water and hot water. Besides, water is received in the annular groove and the gap between the stationary sleeve and the movable sleeve for cushion and lubrication. Thus, the movable sleeve is easier to move for regulation.

6 Claims, 6 Drawing Sheets

PRESSURE BALANCING MIXING VALVE AND WATER VALVE INCLUDING THE SAME

BACKGROUND OF THE INVENTION

Field of the Invention

This application is a Continuation-in-Part of co-pending application Ser. No. 15/383,534, filed Dec. 19, 2016, which is a Continuation-in-Part of prior application Ser. No. 14/080,682 filed Nov. 14, 2013, the entire contents of all of which are hereby incorporated by reference.

Description of the Prior Art

A conventional pressure balancing valve includes a stationary sleeve and a movable sleeve slidably disposed in the stationary sleeve, as shown in patent TW M421420 and TW M421424. The stationary sleeve has a cold water inlet and a hot water inlet arranged spacedly. The movable sleeve has a cold water hole and a hot water hole corresponding to the cold water inlet and the hot water inlet respectively. The movable sleeve has a partition plate inside to partition the movable sleeve into a hot water cavity and a cold water cavity. The cold water cavity and the hot water cavity communicate with the cold water hole and the hot water hole. Two sides of the partition plate are pushed by cold water and hot water respectively. When cold water pressure and hot water pressure vary, the movable sleeve is pushed to move. Thus, overlapping area of the cold water hole and the cold water inlet, and overlapping area of the hot water hole and the hot water inlet change. That is, the overlapping area is reduced when water pressure is too high, and the overlapping area is enlarged when water pressure is too low. Thereby, water temperature can be regulated.

Water temperature is regulated when the movable sleeve is slid in the stationary sleeve, so sensibility is affected by capability of sliding of the movable sleeve. Thus, friction between the movable sleeve and the stationary sleeve must be reduced as possible. However, if the external diameter of the movable sleeve is reduced to prevent from touching the stationary sleeve, the gap between the stationary sleeve and the movable sleeve is too large. In other words, cold water and hot water may be mixed in the gap, so sensibility of the partition plate to the water pressure is also reduced.

On the other hand, if the friction between the movable sleeve and the stationary sleeve is too large, infinitesimal difference of water pressure may be unable to overcome the maximum static friction. Thus, sensibility is reduced.

SUMMARY OF THE INVENTION

The main object of the present invention is to provide a pressure balancing mixing valve whose movable sleeve is able to move easily due to cushion and lubrication by water.

To achieve the above and other objects, a pressure balancing mixing valve is provided. The pressure balancing mixing valve is adapted for being installed in a valve body. The valve body is defined with a receiving room having a first end and a second end. A cold water inlet and a hot water inlet arranged spacedly are formed at the first end, and a cold water outlet and a hot water outlet arranged spacedly are formed at the second end. The valve body has at least one first side wall and at least one second side wall at two sides of the receiving room. The pressure balancing mixing valve includes a stationary sleeve and a movable sleeve.

The stationary sleeve is a hollow tube and is located in the receiving room. The stationary sleeve has a first cavity facing the first side wall and a second cavity facing the second side wall. The stationary sleeve is further formed with a cold water hole and a hot water hole. The cold water hole corresponds to and communicates with the cold water inlet, and the hot water hole corresponds to and communicates with the hot water inlet. The first cavity communicates with the hot water outlet, and the second cavity communicates with the cold water outlet.

The movable sleeve is disposed in the stationary sleeve. The movable sleeve has a cold water end and a hot water end. A cold water cavity is formed at the cold water end, and a hot water cavity is formed at the hot water end. A sliding direction is defined from the cold water end to the hot water end. The movable sleeve is able to slide in the stationary sleeve along the sliding direction. A partition plate is formed in the movable sleeve to separate the cold water cavity and the hot water cavity apart. The movable sleeve is further formed with a cold water slot and a hot water slot. The cold water slot communicates between the cold water hole and the cold water cavity, and the hot water slot communicates between the hot water hole and the hot water cavity. When the movable sleeve is moved toward the first side wall, overlapping area of the cold water slot and the cold water hole is reduced, and overlapping area of the hot water slot and the hot water hole is enlarged. When the movable sleeve is moved toward the second side wall, overlapping area of the cold water slot and the cold water hole is enlarged, and overlapping area of the hot water slot and the hot water hole is reduced. Besides, an external wall of the movable sleeve is formed with at least one annular groove which positionally corresponds to the partition plate.

The present invention also provides a water valve including the pressure balancing mixing valve mentioned above. The water valve includes a valve body. The valve body is defined with a receiving room having a first end and a second end. A cold water inlet and a hot water inlet arranged spacedly are formed at the first end, and a cold water outlet and a hot water outlet arranged spacedly are formed at the second end. The valve body has at least one first side wall and at least one second side wall at two sides of the receiving room.

Thereby, water is able to enter the gap between the movable sleeve and the stationary sleeve to be further received in the annular groove. The water in the annular groove is beneficial for cushion and lubrication. Thus, the movable sleeve is prevented from touching the stationary sleeve so as to move more easily. As a result, the movable sleeve may be more sensible to regulate when water pressure varies.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
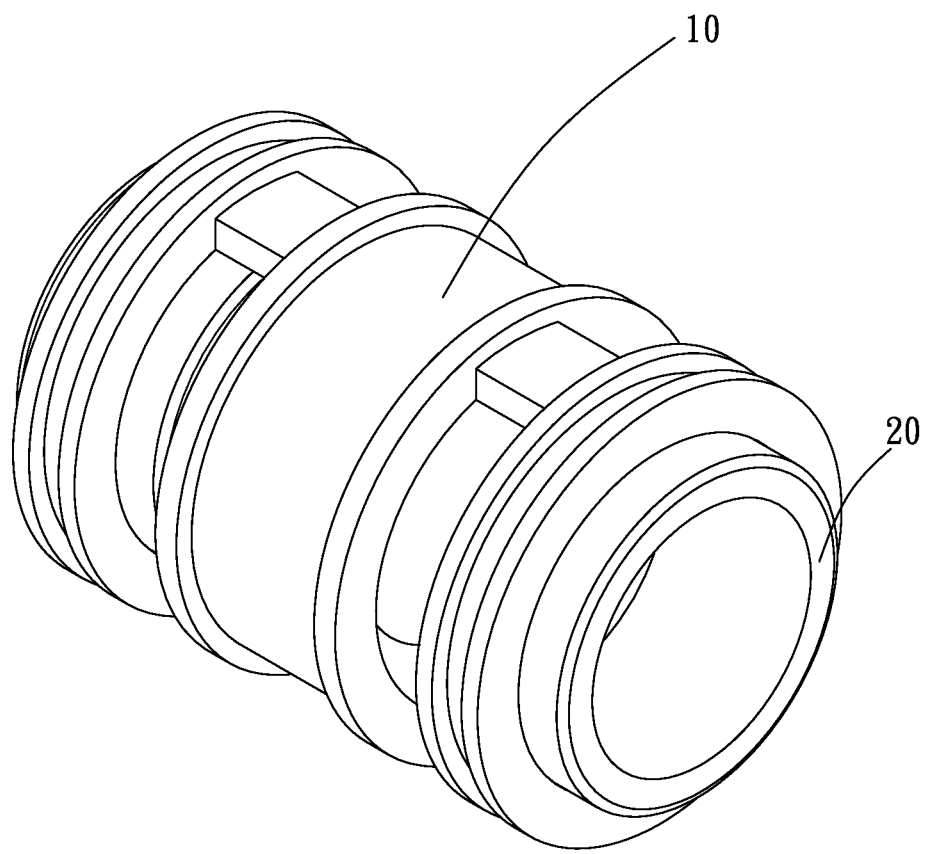
FIG. 1 is a stereogram showing a pressure balancing mixing valve of the present invention.
Figure 2:
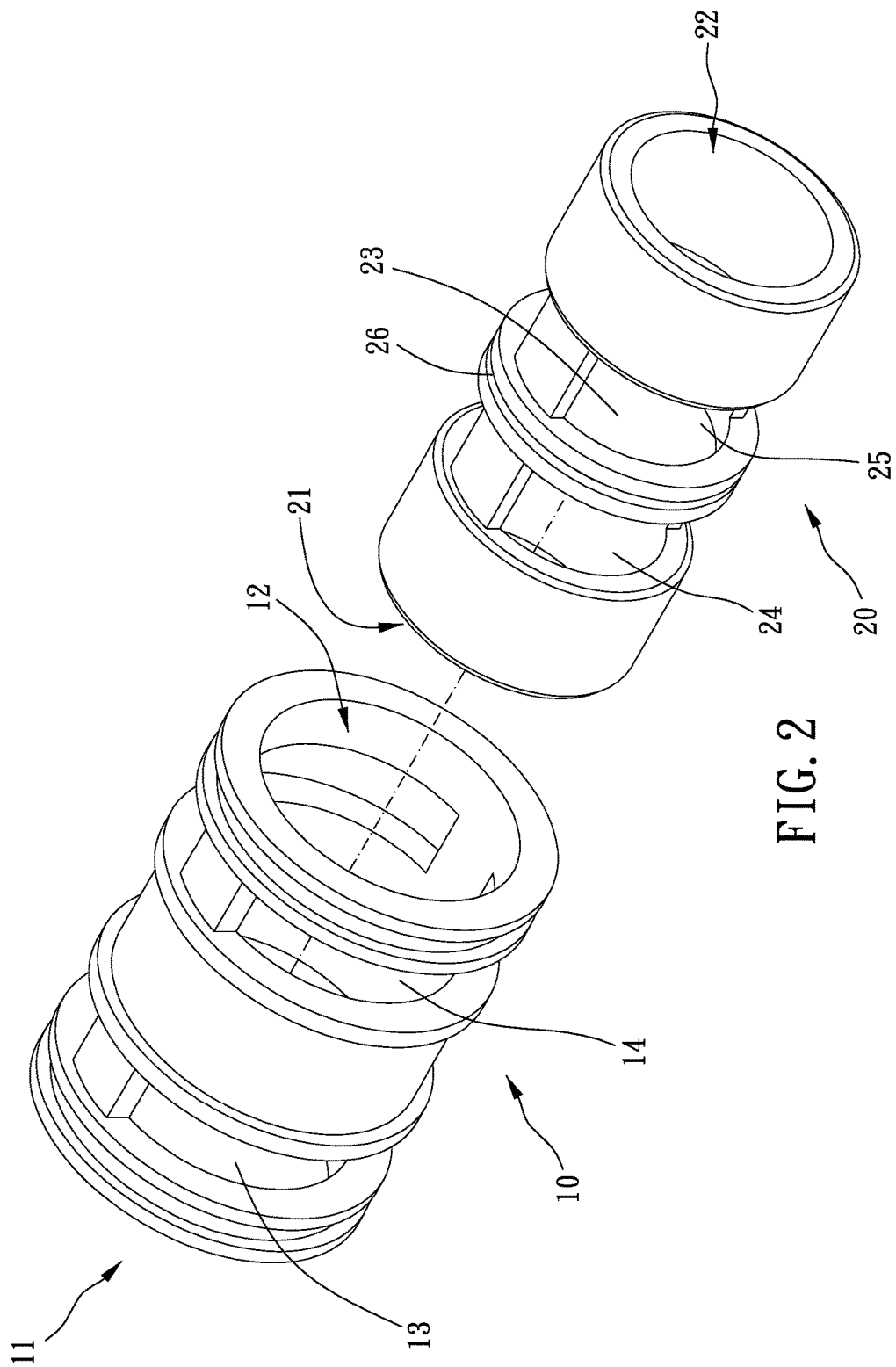
FIG. 2 is a breakdown drawing showing a pressure balancing mixing valve of the present invention.
Figure 3:
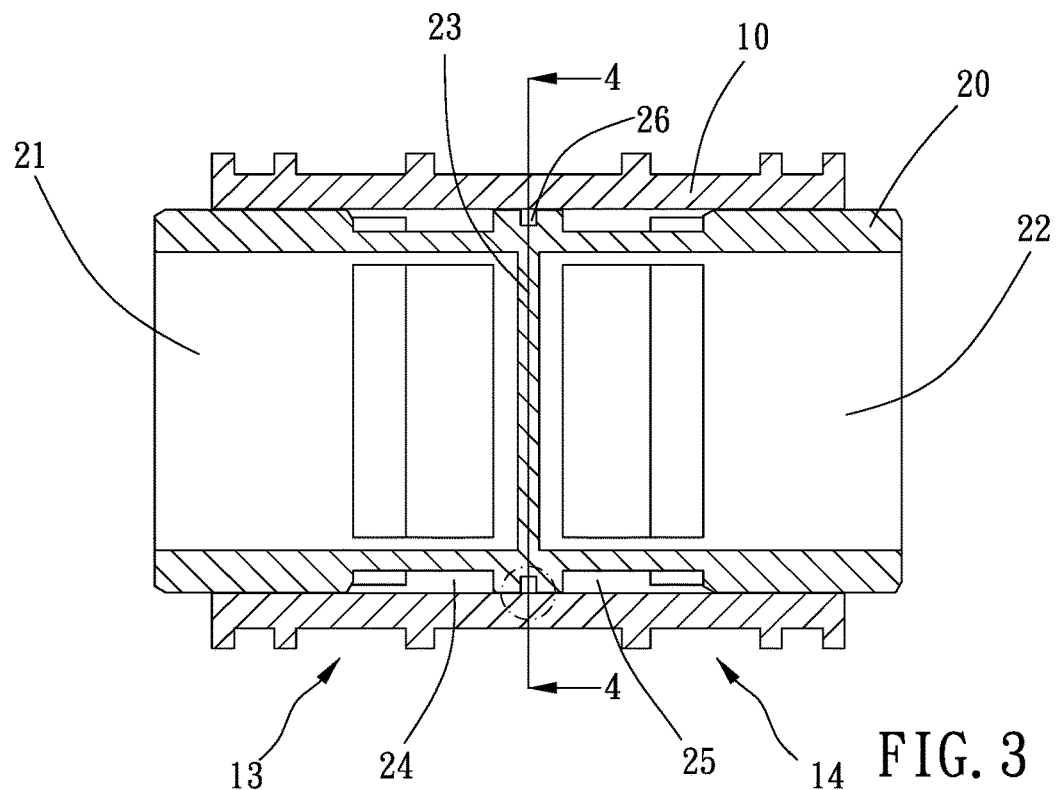
FIG. 3 is a profile showing a pressure balancing mixing valve of the present invention.
Figure 3A:
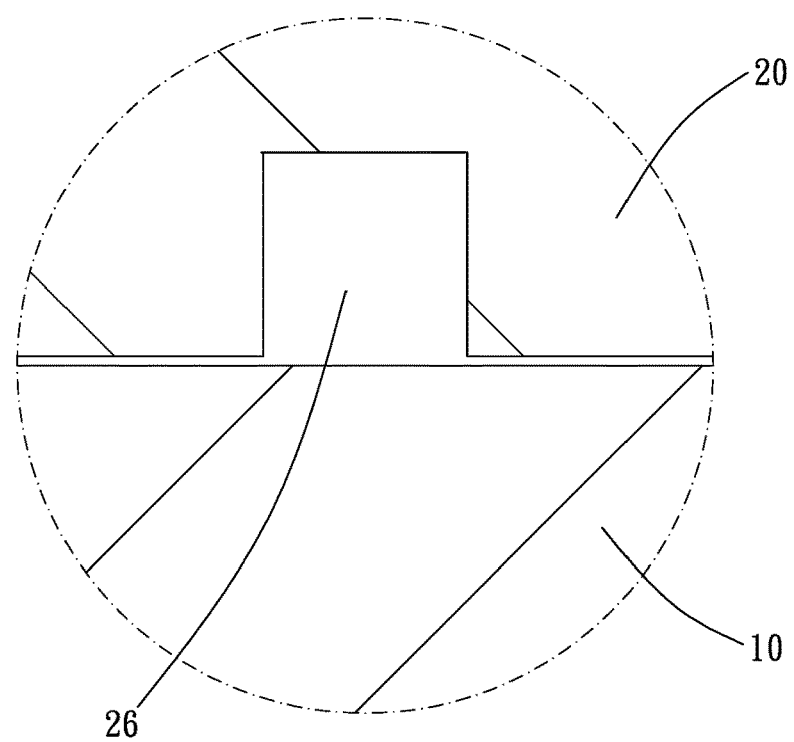
FIG. 3A is a partial enlargement of FIG. 3.
Figure 4:
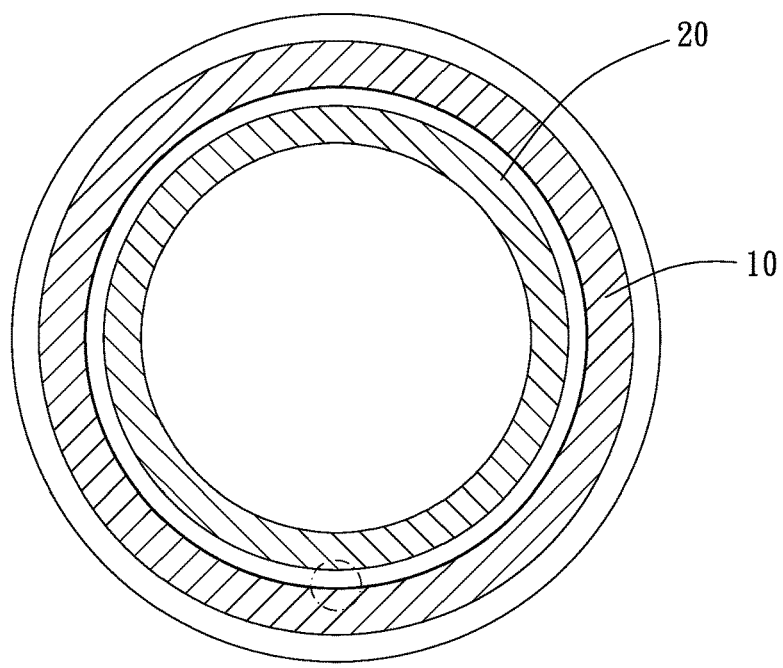
FIG. 4 is a profile showing a pressure balancing mixing valve of the present invention.
Figure 4A:
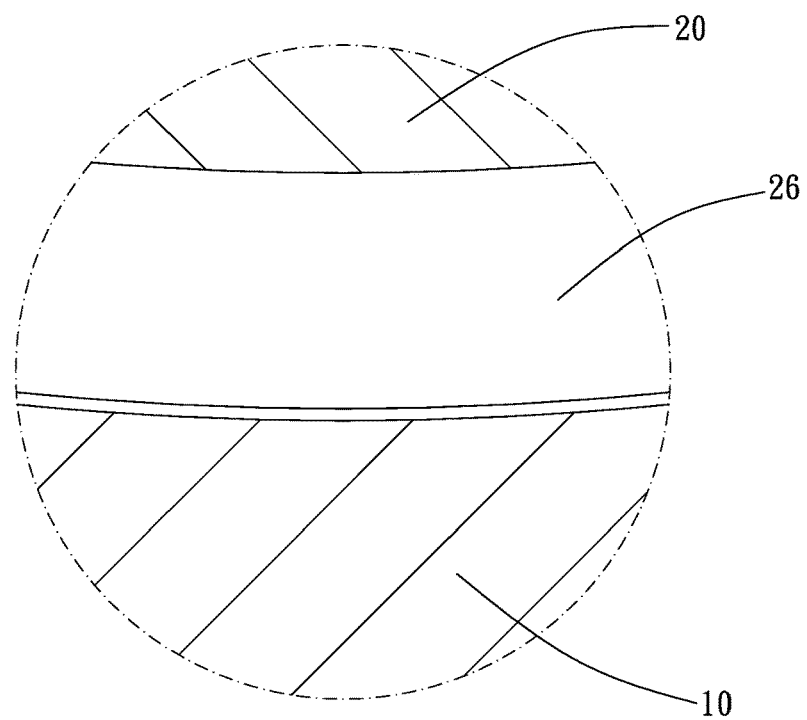
FIG. 4A is a partial enlargement of FIG. 4.
Figure 5:
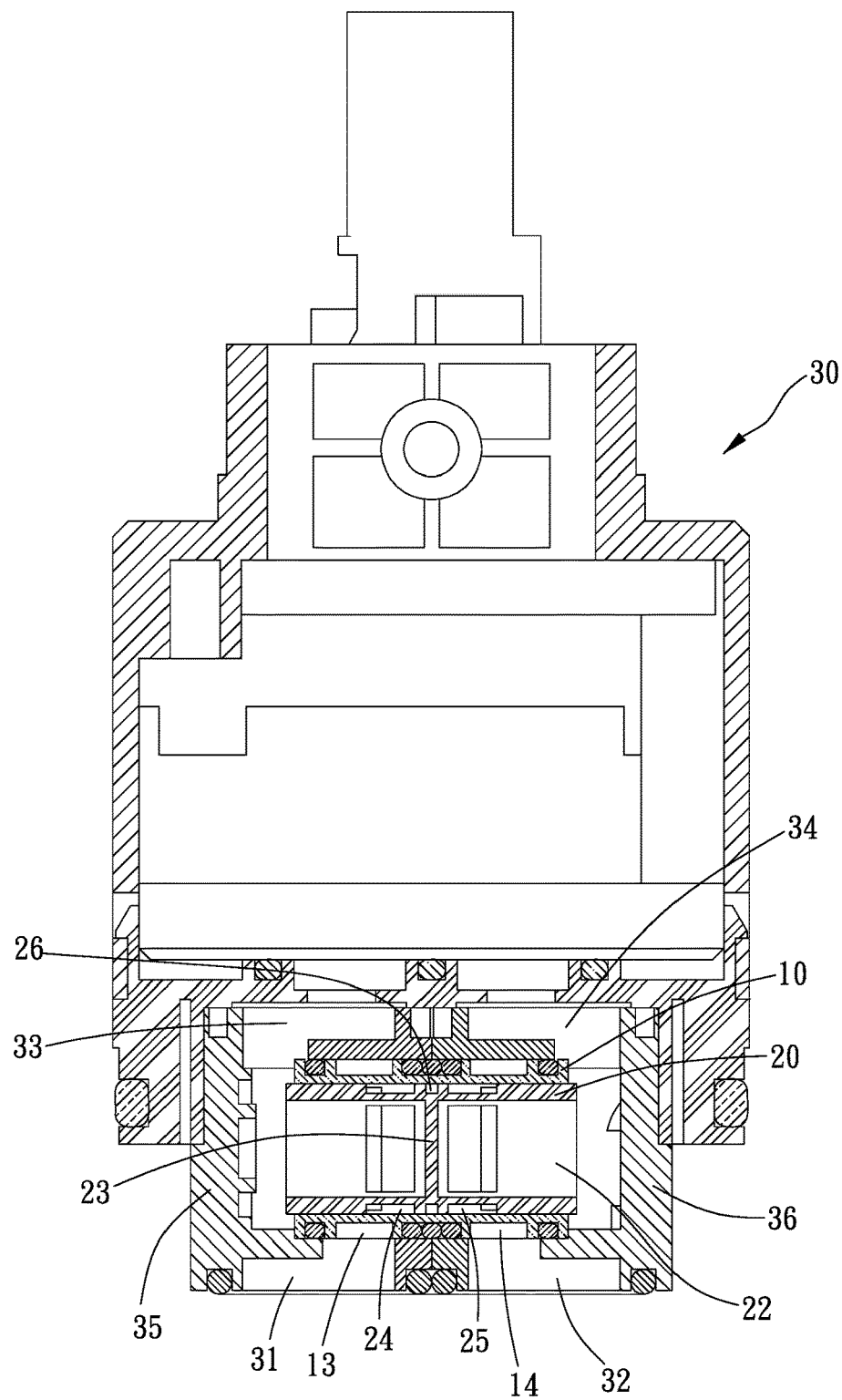
FIG. 5 is a profile showing a water valve of the present invention.

Please refer to FIG. 1 to FIG. 5, a pressure balancing mixing valve and a water valve including the pressure balancing mixing valve are provided in the present invention Referring to FIG. 5, the water valve further includes a valve body 30. The valve body 30 is defined with a receiving room having a first end and a second end. A cold water inlet 32 and a hot water inlet 31 arranged spacedly are formed at the first end, a cold water outlet 34 and a cold water outlet 33 arranged spacedly are formed at the second end. The valve body 30 has a first side wall 35 and a second side wall 36 at two sides of the receiving room.

Please refer to FIGS. 1-4, 3A, and 4A, the pressure balancing mixing valve of the present invention includes a stationary sleeve 10 and a movable sleeve 20.

The stationary sleeve 10 is a hollow tube and is received in the receiving room. The stationary sleeve 10 is formed with a first cavity 11 facing the first side wall 11 and a second cavity 12 facing the second side wall 36. The stationary sleeve 10 is further formed with a cold water hole 14 corresponding to the cold water inlet 32 and a hot water hole 13 corresponding to the hot water inlet 31. The first cavity 11 communicates with the hot water outlet 33, and the second cavity 12 communicates with the cold water outlet 34.

Figure 6:
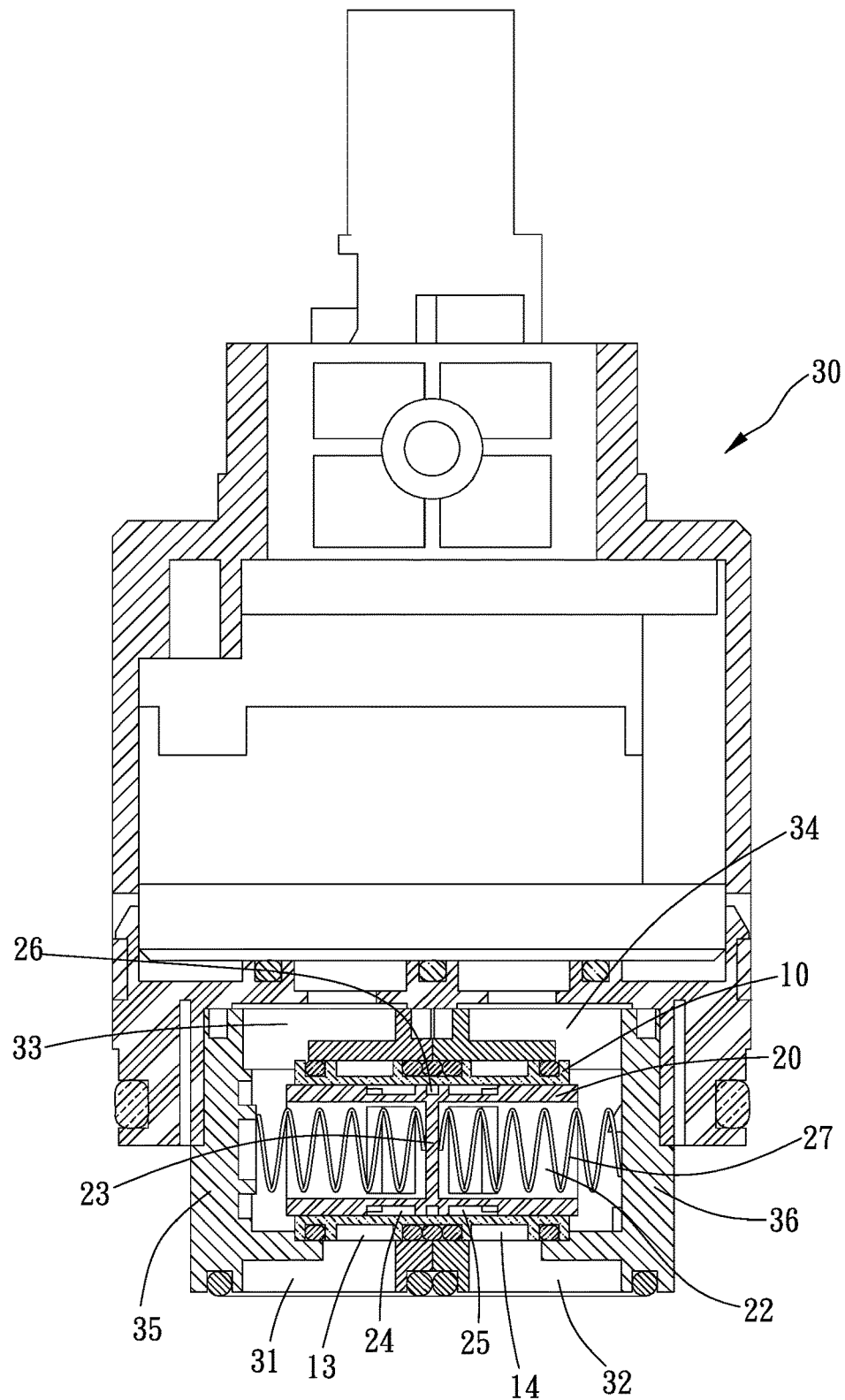
FIG. 6 is a profile showing a second embodiment of the present invention.

The movable sleeve 20 is disposed in the stationary sleeve 10 and has a cold water end and a hot water end. A cold water cavity 22 is formed at the cold water end, and a hot water cavity 21 is formed at the hot water end. A sliding direction is defined from the cold water end to the hot water end. The movable sleeve 20 is able to slide in the stationary sleeve 10 along the sliding direction. The movable sleeve 20 is formed with partition plate therein to separate the cold water cavity 22 and the hot water cavity 21 apart. The movable sleeve 20 is formed with a cold water slot 25 and a hot water slot 24. The cold water slot 25 communicates between cold water hole 14 and the cold cavity 22, and the hot water slot 24 communicates between hot water hole 13 and the hot water cavity 21. When the movable sleeve 20 is moved toward the first side wall 35, overlapping area of the cold water slot 25 and the cold water hole 14 is reduced, and overlapping area of the hot water slot 24 and the hot water hole is enlarged. When the movable sleeve 20 is moved toward the second side wall 36, overlapping area of the cold water slot 25 and the cold water hole 14 is enlarged, and overlapping area of the hot water slot 24 and the hot water hole 13 is reduced. On the other hand, please refer to FIG. 6, in other possible embodiment, the movable sleeve 20 further includes two elastic element 27. One of the elastic elements 27 is located in the hot water cavity 21 and abuts against the partition plate 33 and the first side wall 35 with two ends thereof. Another elastic element 27 is located in the cold water cavity 22 and abuts against the partition plate 33 and the second side wall 36 with two ends thereof. Due to the two elastic elements, even if both cold water pressure and hot water pressure are extremely low, or even lower than the elastic force of the elastic element, the elastic elements can drive the movable sleeve to move back to an equilibrium position so as to allow water to flow through. Thus, even if the movable sleeve is excessively moved due to large ratio of water pressure, it is prevented that the movable sleeve is hard to be moved by water to result deviation of the movable sleeve. Thereby, water can always flow through the pressure balancing mixing valve.

Besides, the movable sleeve 20 is formed with at least one annular groove 26 on an external wall thereof. The annular groove 26 positionally corresponds to the partition plate 23. Preferably, the annular groove 26 surrounds the movable sleeve 20 around the sliding direction. More preferably, a width of the annular groove 26 is defined along the sliding direction, and a depth of the annular groove 26 is defined along a radial direction of the movable sleeve 20. The width and the depth of the annular groove 26 are substantially equal. Preferably, the partition plate 33 is centrally located on the moveable sleeve 20 lengthwise, and the annular groove 26 faces a wall portion of the stationary sleeve 10 in all operating states.

In practical use, the water valve can be installed in a faucet controller, and the hot water inlet 31 and the cold water inlet 32 are connected to a cold water source and the hot water source respectively so as to allow cold water and hot water to flow in. Cold water can enter the cold water cavity 22 via the cold water inlet 32, the cold water hole 14, and the cold water slot 25, and further flow out via the cold water outlet 34. Hot water enters the hot water cavity 21 via the hot water inlet 31, the hot water hole 13, and the hot water slot 24, and further flow out via the hot water outlet 33. Thereafter, cold water and hot water further enter a mixing room for mixing. When hot water pressure is higher than cold water pressure, the partition plate 23 is pushed by hot water to move the movable sleeve 20 toward the second side wall 36. As a result, overlapping area of the hot water hole 13 and the hot water slot 24 is reduced, and overlapping area of the cold water hole 14 and the cold water slot 25 is enlarged. Thus, cross-section area of hot water flow is reduced, and cross-section area of cold water flow is enlarged. Thereby, the effect of higher hot water pressure is offset. On the contrary, when cold water pressure is higher than hot water pressure, the partition plate 23 is pushed by cold water to move the movable sleeve 20 toward the first side wall 35. Thereafter, overlapping area of the hot water hole 13 and the hot water slot 24 is enlarged, and overlapping area of the cold water hole 14 and the cold water slot 25 is reduced. Thus, cross-section area of hot water flow is enlarged, and cross-section area of cold water flow is reduced. Thereby, the effect of higher cold water pressure is offset.

Specifically, small amount of water can enter the annular groove 26 via the gap between the movable sleeve 20 and the stationary sleeve 10. That is to say, water between the movable sleeve 20 and the stationary sleeve 10 is beneficial for cushion and lubrication. When the movable sleeve 20 is moving in the stationary sleeve 10, the floating movable sleeve 20 hardly touches inner wall of the stationary sleeve 10. Thus, friction between the movable sleeve 20 and the stationary sleeve 10 is reduced. As a result, even if the difference between hot water pressure and cold water pressure is extremely small, the movable sleeve 20 can be pushed to move because the maximum static friction can be ignored. Thus, the present invention is more sensible about the difference of water pressure and is able to act immediately.

In conclusion, the present invention has simple structure and is easy to manufacture, and capability of sliding of the movable sleeve is improved.

What is claimed is:

1. A pressure balancing mixing valve, adapted for being installed in a valve body, the valve body being defined with a receiving room having a first end and a second end, a cold water inlet and a hot water inlet arranged spacedly being located at the first end, a cold water outlet and a hot water outlet arranged spacedly being formed at the second end, the valve body having at least one first side wall and at least one second side wall at two sides of the receiving room, the pressure balancing mixing valve including:

a stationary sleeve, being a hollow tube and being located in the receiving room, having a first cavity facing the first side wall and a second cavity facing the second side wall, the stationary sleeve being formed with a cold water hole and a hot water hole, the cold water hole corresponding to and communicating with the cold water inlet, the hot water hole corresponding to and communicating with the hot water inlet, the first cavity communicating with the hot water outlet, the second cavity communicating with the cold water outlet;

a movable sleeve, disposed in the stationary sleeve, the movable sleeve having a cold water end and a hot water end, a cold water cavity being formed at the cold water end, a hot water cavity being formed at the hot water end, a sliding direction being defined from the cold water end to the hot water end, the movable sleeve being slidable in the stationary sleeve along the sliding direction, a partition plate being formed in the movable sleeve to separate the cold water cavity and the hot water cavity apart, the movable sleeve being formed with a cold water slot and a hot water slot, the cold water slot communicating between the cold water hole and the cold water cavity, the hot water slot communicating between the hot water hole and the hot water cavity, overlapping area of the cold water slot and the cold water hole being reduced, and overlapping area of the hot water slot and the hot water hole being enlarged when the movable sleeve is moved toward the first side wall, an overlapping area of the cold water slot and the cold water hole being enlarged, and the overlapping area of the hot water slot and the hot water hole being reduced when the movable sleeve is moved toward the first side wall;

wherein an external wall of the movable sleeve is formed with at least one annular groove, the annular groove positionally corresponds to the partition plate, the annular groove surrounds the movable sleeve about an axis defined by the sliding direction, a gap is formed between the movable sleeve and the stationary sleeve, water is able to enter the annular groove via the gap to make the movable sleeve float;

wherein the partition plate is centrally located on the moveable sleeve lengthwise, and the annular groove faces a wall portion of the stationary sleeve in all operating states.

2. The pressure balancing mixing valve of claim 1, wherein a width of the annular groove is defined along the sliding direction, a depth of the annular groove is defined along a radial direction of the movable sleeve, the width and the depth of the annular groove are substantially equal.

3. The pressure balancing mixing valve of claim 1, wherein the movable sleeve further includes two elastic elements, one of the elastic element is located in the hot water cavity and abuts against the partition plate and the first side wall with two opposite ends respectively, the other elastic element is located in the cold water cavity and abuts against the partition plate and the second side wall with two opposite ends respectively.

4. A water valve including the pressure balancing mixing valve of claim 1, further including the valve body, the valve body being defined with the receiving room having the first end and the second end, the cold water inlet and the hot water inlet arranged spacedly being formed at the first end, the cold water outlet and the hot water outlet arranged spacedly being formed at the second end, the valve body having at least one said first side wall and at least one said second side wall at two sides of the receiving room.

5. The water valve of claim 4, wherein a width of the annular groove is defined along the sliding direction, a depth of the annular groove is defined along a radial direction of the movable sleeve, the width and the depth of the annular groove are substantially equal.

6. The water valve of claim 4, wherein the movable sleeve further includes two elastic elements, one of the elastic element is located in the hot water cavity and abuts against the partition plate and the first side wall with two opposite ends respectively, the other elastic element is located in the cold water cavity and abuts against the partition plate and the second side wall with two opposite ends respectively.

* * * * *